United States Patent [19]

Hoefler et al.

[11] Patent Number: 5,324,531

[45] Date of Patent: Jun. 28, 1994

[54] FAT SUBSTITUTE

[75] Inventors: Andrew C. Hoefler, Warwick; Julia A. Sleap, Middletown, both of N.Y.; Jens E. Trudso, Ramsey, N.J.

[73] Assignee: Hercules Incorporated, Wilmington, Del.

[21] Appl. No.: 20,431

[22] Filed: Feb. 22, 1993

Related U.S. Application Data

[63] Continuation of Ser. No. 661,269, Feb. 26, 1991, abandoned.

[51] Int. Cl.$^5$ ................................................ A23L 1/05
[52] U.S. Cl. ...................... 426/573; 426/575; 426/577; 426/589; 426/565; 426/605; 426/804
[58] Field of Search ............ 426/518, 603, 573, 574, 426/575, 577, 578, 801, 565, 589, 605, 633

[56] References Cited

U.S. PATENT DOCUMENTS

| | | |
|---|---|---|
| 2,036,922 | 4/1936 | Clark et al. . |
| 2,786,763 | 3/1957 | Rivoche . |
| 2,791,508 | 5/1957 | Rivoche . |
| 2,859,115 | 11/1958 | Rivoche . |
| 3,023,104 | 2/1962 | Battista ............................ 426/658 |
| 3,573,058 | 3/1971 | Tiemstra ........................... 426/658 |
| 3,764,707 | 10/1973 | Habersberger . |
| 4,263,334 | 4/1981 | McGinley ......................... 426/573 |
| 4,305,970 | 12/1981 | Moran et al. . |
| 4,828,396 | 5/1989 | Singer et al. . |
| 4,844,922 | 7/1989 | Uemura ............................. 426/577 |
| 4,911,946 | 3/1990 | Singer et al. ..................... 426/658 |
| 5,011,701 | 4/1991 | Baer et al. . |
| 5,100,688 | 3/1992 | Cox .................................... 426/578 |
| 5,133,979 | 7/1992 | Clarke ............................... 426/577 |
| 5,153,020 | 10/1992 | Singer et al. . |

FOREIGN PATENT DOCUMENTS

| | | |
|---|---|---|
| 40452 | 9/1978 | Australia . |
| 0355908 | 2/1990 | European Pat. Off. . |
| 0432835 | 6/1991 | European Pat. Off. . |
| 0437360 | 7/1991 | European Pat. Off. . |
| 63-139108 | 6/1988 | Japan . |
| 8912403 | 12/1989 | PCT Int'l Appl. . |
| 9119424 | 12/1991 | World Int. Prop. O. . |

OTHER PUBLICATIONS

Thom et al., "Interchain Associations of Alginate and Pectines", *Prog. Ed. Nutr Sci.*, vol. 6 (1982) pp. 97–108.
Hercules Incorporated, Natures' Simple Solution to Fat Replacement . . . Splended TM, 1991, pp. 1–10.
Hercules Incorporated, News Release, "New, Natural Fat Replacer Introduced", Sep. 23, 1991.

*Primary Examiner*—Carolyn Paden
*Attorney, Agent, or Firm*—David Edwards

[57] ABSTRACT

A fat simulating composition is composed of a substantial portion of elongated, irregularly shaped carbohydrate gel particles having a longest axial dimension of up to 250 microns with a mean volume diameter ranging from about 10 microns to about 100 microns; the particles are in a hydrated state so as to have the substantially smooth organoleptic character of an oil emulsion. This fat simulating product is substituted in foods for all or a portion of the fat and/or oil used in that food product.

28 Claims, No Drawings

FAT SUBSTITUTE

This application is a continuation of application No. 07/661,269, filed Feb. 26, 1991, now abandoned.

BACKGROUND

The invention relates to edible fat substitutes which include shredded carbohydrate gel particles.

Prior to the present invention, it was believed that in order to simulate a fat sensation in the mouth, that carbohydrate particles had to be substantially spheroidal in shape and had to have a mean diameter particle size distribution between about 0.1 micron and about 2 microns ($\mu$) with less than about 2% of the number of particles exceeding $3\mu$. The particles also had to be non-aggregated. If the carbohydrate particles meet these criteria, U.S. Pat. No. 4,911,946 teaches that they will exhibit the substantially smooth organoleptic character of an oil-in-water emulsion and could be used to replace all or a portion of the fat or cream in food products such as ice cream, yogurt, salad dressings, mayonnaise, cream, cream cheese, other cheeses, sour cream, sauces, icings, whipped toppings, frozen confections, milk, coffee whiteners, and spreads. PCT publication no. WO 89/12403 also discloses that a fat-like mouthfeel can result from carbohydrate particles having a substantially spheroidal shape with a mean diameter distribution in the range of from about 0.1 to about 4 microns, with less than about 2% of the total number of particles larger than about $5\mu$. However, this publication demonstrated, in Example 5, the criticality of the particle sizes in an alginate product by showing that the product was found to provide some powdery character upon swallowing as a consequence of the larger particle volume weighted mean equivalent diameter for alginate of Example 5 verses that for konjak in Example 3. Further, this publication demonstrates the need for specialized equipment (i.e., U.S. Pat. No. 4,828,396), or specialized separation to obtain the correct particle range (i.e., sieving and centrifugation), or multiple passes through a very high pressure homogenizer (ten times at greater than or equal to 9,000 psig). Also, this prior art demonstrates an overall low yield (i.e., 10% yield in Example 3).

A need exists in the food industry for an improved fat simulating substance for which strict size and shape control of the particles is not required. Hence, the present invention overcomes the disadvantages of the prior art by providing a fat-simulating composition which does not rely on strict particle size and shape control, or specialized equipment or processes, while being readily producable in a high yield.

SUMMARY OF THE INVENTION

This invention is directed to a fat simulating composition comprising a substantial portion of elongated, irregularly shaped carbohydrate gel particles having a longest axial dimension of up to 250 microns with a mean volume diameter ranging from about 10 microns to about 100 microns, the particles being in a hydrated state so as to have the substantially smooth organoleptic character of an oil emulsion.

This invention also comprehends a process for making a fat simulating composition comprising:
a) mixing a carbohydrate with water to form a gel,
b) chopping the gel to form a processable mass comprised of coarse particles of less than about 10 mm in size,
c) shearing or shredding the coarse particles to form irregularly shaped carbohydrate gel particles having a longest axial dimension of up to 250 microns with a mean volume diameter ranging from about 10 microns to about 100 microns, the particles being in a hydrated state effective to have the substantially smooth organoleptic character of an oil emulsion.

DETAILED DESCRIPTION OF THE INVENTION

Gel formation is accomplished by either (i) mixing a gel forming carbohydrate with water and causing a gel to form, then shredding the gel to form shredded gel particles which are then mixed with edible material to form a food product; or, (ii) mixing a gel forming carbohydrate with water and edible material, and causing a gel to form; after which the gel is shredded to form shredded gel particles which make up the food product. Food products in which fat simulating substances in accordance with the invention may be used include margarine, spreads, butter, mayonnaise, salad dressings, ice cream, icings, bakery fillings, processed cheeses, cream cheeses, sour cream, peanut butter, soups, sauces, gravies, baked goods and meat products such as sausages, luncheon meats and patties.

The fat-simulating gel particles of this invention are shredded into irregular shapes. A substantial portion of these gel particles may be described as being elongated, rod-like, ribbon-like, platelets or nonspheroidal. These gel particles appear to be highly associated, i.e., crowded or packed into loosely adhered groups.

The shredded gel particles of this invention are typically branched and/or elongated having a length of up to 250 microns with less than about 3% by weight of the gel particles being less than $5\mu$ in size. Carbohydrates are preferred for use in forming gel particles in accordance with the invention.

Preferably, the gel particles in this invention are heat stable and shear irreversible. Heat stable gel particles are useful in food processing which includes a heat treatment, such as warming, cooking, boiling, pasteurization or sterilization. Some carbohydrates such as mixtures of xanthan gum and locust bean gum do not form heat stable gel particles. At temperatures above 60° C., these gel particles melt and upon cooling they reset to a continuous gel, and consequently lose their fat simulating effect. Some carbohydrates such as iota carrageenan do not form shear irreversible gel particles. When shearing is stopped, the gel particles will tend to reform into larger gel particles, and thus lose their fat simulating effect.

Carbohydrates useful for forming heat stable gels in this invention are those that do not melt during the heat treatment of the food product. Examples of such carbohydrates include pectins (i.e., high methoxyl, low methoxyl and amidated pectins and mixtures thereof), pectate, alginate, agar-agar, konjac, gellan gum, curdlan, and kappa carrageenan. Thus, preferred carbohydrates for use in forming gel particles in this invention include pectins, pectates (such as calcium, sodium or potassium pectate), alginates (such as calcium, sodium or potassium alginate), agar-agar, konjac, gellan gum, kappa carrageenan (such as calcium, sodium, potassium or ammonium kappa carrageenan) and mixtures thereof.

Food products containing the fat-simulating composition of this invention may be prepared by adding the preformed fat-simulating agent to a food product base, or by adding a carbohydrate solution directly to the food product base at the appropriate point in the food manufacturing process and forming the fat simulating agent in situ.

In the instance where the fat-simulating agent is preformed, the gel particles of the invention are formed by dissolving a carbohydrate in water. Dissolution may be accelerated by heating the water to temperatures above 40° C. Additional ingredients may be added at this time, such as flavors, preservatives, acidulents, salts, sugars, colorants, etc. Since most food products contain a water phase in which solutes are dissolved, in order for the gel particles to stay unchanged during storage, the water activities of the carbohydrate making up the gel particles and the water phase of the food product are preferably comparable. Thus, in the preparation of the gel particles, some of the solutes, such as sugars and salts, are incorporated into the gel particle in order to prevent diffusion of water from the gel particles into the water phase of the food product.

A gel is then formed by temperature control, pH control, or by addition of a gel inducing agent. Examples of gel inducing agents are cations, such as calcium, sodium, and potassium.

In the instance where the fat-simulating composition is made in situ, the ingredients making up the food product are added to the carbohydrate solution at the appropriate point in the food manufacturing process. The gel is formed as described above. It is well known in the food industry that some food components or additives may already contain gel inducing agents and thus the addition of such agents may not be required.

Fat-simulating compositions of this invention include from 0.1 to 30 percent of a carbohydrate, from 0 to 10 percent of a sequestering agent, from 0 to 5 percent of a flavor, from 0 to 5 percent of gel inducing agents dispersed in from 72 to 99.9 percent water, from about 0 to about 5 percent of a stabilizer, and from about 0 to about 5 percent of an emulsifier. Sequestering agents are used to control the speed of gelation by controlling the availability of the gelling cations. Typical examples of sequestering agents are citrates and phosphates. Stabilizers are used to control the amount of free water in the gel particles to minimize the amount of syneresis (i.e., exudation of water). The emulsifiers are used in those cases where some fat is present in the food product to ensure a stable water-in-oil (or oil-in-water) emulsion. Additionally, emulsifiers are used to control syneresis.

Fat-simulating compositions in accordance with the invention contain at least 0.1% carbohydrate. Preferably, gel particles contain at least 0.5% carbohydrate.

The longest dimension of the gel particles present in the fat-simulating compositions of the invention is up to 250 microns. The mean volume diameter should be in the range of about $10\mu$ to about $100\mu$, preferably $25\mu$ to $75\mu$.

The fat-simulating compositions of this invention are prepared by a process that consists essentially of mixing, gelling, chopping, and shredding carbohydrates to form particles of the desired size and shape. This is a simple process from which 100% of the product serves as a fat-simulating composition. It is not required to use specialized equipment, or complicated processing steps, such as separation, dilution or multiple passing through a shearing device. In the chopping step, the gel is chopped into coarse particles in a conventional blender or colloid mill. This step is carried out so that the gel particles are of a suitable size that can be fed to a homogenizer. The chopped particles are then passed through a conventional shearing device (e.g., a homogenizer, rotor-stator, etc.) only once at normal shearing conditions, generally from 500 to 5000 psig, preferably 1000 to 4000 psig, most preferably 1500 to 3000 psig. When a two stage homogenizer is used, the first stage operates at a pressure of 500 to 5000 psig., preferably 1000 to 3000 psig, and the second stage operates at a pressure of 0 to 700 psig., preferably 300 to 700 psig. Only one pass through the shearing device, as mentioned above, is required for producing irregular particles suitable for this invention.

Throughout this disclosure percentages refer to percents by weight unless otherwise specified.

EXAMPLE I

Gel particles were prepared from the following ingredients:

|  | Percent |
| --- | --- |
| Deionized Water | 95.85 |
| LM Pectin | 1.40 |
| HM Pectin, Rapid Set Type | 0.20 |
| Deionized Water | 2.00 |
| Calcium chloride dihydrate | 0.33 |

The product was prepared as follows:

The deionized water was placed in a Stephan model 25 vertical cutter/mixer, and the mixer was turned on to its highest speed setting. The pectins were added to the cutter/mixer through an opening in the top lid, and the machine was left on high speed for five minutes to ensure complete dissolution and hydration of the pectins. The calcium chloride was dissolved in six times its weight of deionized water (i.e., 0.33 part in 2.00 parts $H_2O$). With the cutter/mixer still operating on high speed, the calcium chloride solution was slowly added through the top opening over a period of ten seconds. The cutter/mixer was allowed to continue to operate at high speed for a period of five to ten minutes. During this time, the pectins reacted with the calcium ions to form a gel, while the rotating blade of the cutter/mixer reduced the particle size of the gel to about 1 or 2 min. At the end of this time, the cutter/mixer was shut off and its contents were transferred to a Manton-Gaulin model 15M homogenizer. The homogenizer was operated with a second stage pressure drop of 500 psig, and a first stage pressure drop of 1200 psig, for a total pressure drop of 1700 psig. The emerging sheared pectin gel particles had the appearance and texture of oil or cream. The volume mean diameter of the gel particles was 49.9 $\mu$ as measured by a Brinkmann Particle Size Analyzer. The particles were seen to be highly irregular by light microscopy, with longest dimensions of up to $250\mu$. Shape Factor analysis by the Brinkmann Analyzer confirmed the high degree of irregularity of the particles. The gel particles prepared in this example displayed a smooth and creamy texture.

EXAMPLE II

A no-oil imitation mayonnaise was prepared from the following ingredients:

| | Percent | Order of Addition |
|---|---|---|
| Deionized Water | 63.553 | A |
| LM Pectin | 2.100 | A |
| HM Pectin, Rapid Set Type | 0.300 | A |
| Sugar | 4.000 | B |
| Salt | 2.750 | B |
| Sodium Citrate Dihydrate | 0.550 | B |
| Titanium Dioxide | 0.300 | B |
| Sodium Benzoate | 0.100 | B |
| Potassium Sorbate | 0.100 | B |
| EDTA (tetrasodium salt) | 0.007 | B |
| Mustard Flour | 0.050 | B |
| Liquid Egg Yolks | 15.800 | C |
| Vinegar (100 Grain) | 6.600 | D |
| Deionized Water | 3.300 | E |
| Calcium Chloride Dihydrate | 0.440 | E |
| | 100.000 | |

The product was prepared as follows:

The deionized water was placed in a stainless steel beaker, into which was lowered a Gifford-Wood model 76-1LB high shear mixer. The mixer was on high speed, the pectins were then added to the water, and were allowed to mix for five to ten minutes to ensure complete hydration. The "B" ingredients were dry mixed together, added to the beaker, and allowed to hydrate for about two minutes. Next, the "C" ingredient was added in, followed by the "D" ingredient. High speed mixing was continued for another two minutes. With the mixer still operating at high speed, the "E" ingredient (a calcium chloride solution) was added to the beaker, and mixing was continued for an additional five minutes. The mixer was then turned off and the mixture was removed from the beaker and heated to 85 degrees Celsius for three minutes to pasteurize it. Next, the product was briefly subjected to a vacuum of 25 inches Hg to completely de-aerate it, and then the still hot product was passed through a Manton-Gaulin model 15M homogenizer at a second/first stage back pressure of 500/2500 psig. The product was filled into suitable containers and then cooled to ambient temperature; this product had a full bodied, creamy, and smooth texture.

EXAMPLE III

A no-oil imitation salad dressing was prepared from the following ingredients:

| | Percent | Order of Addition |
|---|---|---|
| Deionized Water | 64.077 | A |
| LM Pectin | 0.900 | A |
| HM Pectin, Rapid Set Type | 0.100 | A |
| Locust Bean Gum | 0.300 | A |
| Buttermilk Powder | 3.000 | B |
| Sugar | 4.000 | B |
| Salt | 1.850 | B |
| Sodium Citrate Dihydrate | 0.550 | B |
| Titanium Dioxide | 0.300 | B |
| Sodium Benzoate | 0.100 | B |
| Potassium Sorbate | 0.100 | B |
| EDTA (tetrasodium salt) | 0.007 | B |
| Mustard Flour | 0.020 | B |
| Garlic Powder | 0.271 | B |
| Onion Powder | 0.271 | B |
| Ground Black Pepper | 0.100 | B |
| Dried Parsley | 0.046 | B |
| Liquid Egg Yolks | 15.800 | C |
| Vinegar (100 Grain) | 6.600 | D |
| Deionized Water | 1.420 | E |
| Calcium Chloride Dihydrate | 0.188 | E |
| | 100.000 | |

The product was prepared as follows:

The deionized water was placed in a stainless steel beaker, into which was lowered a Gifford-Wood model 76-1LB high shear mixer. The mixer was set on high speed, the pectins were then added to the water, and were allowed to mix for five to ten minutes to ensure complete hydration. The "B" ingredients were dry mixed together, added to the beaker, and allowed to hydrate for about two minutes. Next, the "C" ingredient was added in, followed by the "D" ingredient. High speed mixing was continued for another two minutes. With the mixer still operating at high speed, the "E" ingredient (a calcium chloride solution) was added to the beaker, and mixing continued for an additional five minutes. The mixer was then turned off and the mixture was removed from the beaker; and the product was heated to 85 degrees Celsius for three minutes to pasteurize it, and to fully hydrate the locust bean gum. Next, the product was briefly subjected to a vacuum of 25 inches Hg to completely de-aerate it, and then the still hot product was passed through a Manton-Gaulin model 15M homogenizer at a second/first stage back pressure of 500/2500 psig. The product was filled into suitable containers and then cooled to ambient temperature; this product was creamy and smooth with a spoonable texture.

EXAMPLE IV

A no-fat imitation ice cream product was prepared from the following ingredients:

| | Percent | Order of Addition |
|---|---|---|
| Deionized Water | 62.006 | A |
| LM Pectin | 0.310 | A |
| HM Pectin, Rapid Set Type | 0.034 | A |
| Deionized Water | 2.000 | B |
| Calcium Chloride Dihydrate | 0.050 | B |
| Deionized Water | 10.000 | C |
| Corn Syrup Solids (42 DE) | 5.000 | C |
| Sugar | 11.000 | C |
| Nonfat Dry Milk | 11.000 | C |
| Cellulose Gum 7LF | 0.500 | C |
| Emulsifier | 0.100 | C |
| | 100.000 | |

The product was prepared as follows:

The "A" deionized water was placed in a stainless steel beaker, into which was lowered a Gifford-Wood model 76-1LB high-shear mixer. The mixer was set on high speed, the pectins were then added to the water, and were allowed to mix for five to ten minutes to ensure complete hydration of the pectins. The calcium chloride solution ("B") was added slowly with the mixer still operating on high speed. The mixer was allowed to continue to operate at high speed for a period of five to ten minutes. During this time, the pectins reacted with the calcium ions to form a gel, while the rotating blade of the mixer reduced the particle size of the gel to about 1 or 2 min. At the end of this time, the mixer was shut off and the mixture was removed from the beaker and transferred to a Manton-Gaulin model 15M homogenizer. The homogenizer was operated with a second stage pressure drop of 500 psig, and the first stage was operated with a pressure drop of 2000 psig, for a total pressure drop of 2500 psig. The resulting sheared pectin gel particles were then put aside while the rest of the product was prepared. These gel particles had a volume mean diameter of 52.7μ as measured on a Brinkmann Particle Size Analyzer. The gel particles were very irregular in shape when viewed with a light microscope.

The "C" water was placed in a stainless steel beaker, into which was lowered a Gifford-Wood model 76-1LB high shear mixer. The mixer was set on high speed, the remainder of the "C" ingredients were then added to the water, and were allowed to mix for five to ten minutes to ensure complete hydration. The sheared pectin gel ("A" ingredients) was added in at this point, and the mixer was allowed to continue for another three minutes. The product was then heated to 85 degrees celsius for 30 minutes for pasteurization, and was then homogenized at 500/2500 psig and cooled to 7 degrees Celsius. The product was then loaded into a Taylor model 103-12 ice cream machine, and frozen to the proper consistency. This ice cream product had a creamy texture with excellent melting qualities.

EXAMPLE V

A no-fat imitation ice cream product was prepared from the same formula and procedure as in EXAMPLE IV, with the exception that sodium alginate ("Manugel DMB" Kelco Inc.) was substituted for the LM pectin. In this case the gel particles had a volume mean diameter of 44.4μ as measured by the Brinkmann Particle Size Analyzer. The end product was as good as the LM pectin based version, and both had the texture and consistency of standard of identity ice cream.

EXAMPLE VI

A no-fat cream of mushroom soup product was prepared from the following ingredients:

| | Percent | Order of Addition |
|---|---|---|
| Deionized Water | 10.000 | A |
| LM Pectin | 0.147 | A |
| HM Pectin, Rapid Set Type | 0.023 | A |
| Deionized Water | 1.000 | B |
| Calcium Chloride Dihydrate | 0.034 | B |
| Deionized Water | 84.981 | C |
| Titanium Dioxide | 0.300 | C |
| White Pepper | 0.005 | C |
| Celery Seed | 0.010 | C |
| Non Fat Dry Milk | 0.500 | C |
| Locust Bean Gum or Guar Gum | 0.500 | C |
| Starch | 0.750 | C |
| Flavors | 0.750 | C |
| Salt | 1.000 | C |
| | 100.000 | |

The product was prepared as follows:

The "A" deionized water was placed in a stainless steel beaker, into which was lowered a Gifford-Wood model 76-1LB high shear mixer. The mixer was set on high speed, the pectins were then added to the water, and were allowed to mix for five to ten minutes to ensure complete hydration of the pectins. The calcium chloride solution ("B") was added slowly with the mixer still operating on high speed. The mixer was allowed to continue to operate at high speed for a period of five to ten minutes. During this time, the pectins reacted with the calcium ions to form a gel, while the rotating blade of the mixer reduced the particle size of the gel to about 1 or 2 mm. At the end of this time, the mixer was shut off; and the contents of the beaker were removed from the beaker and were transferred to a Manton-Gaulin model 15M homogenizer. The homogenizer was operated with a second stage pressure drop of 500 psig, and the first stage was operated with a pressure drop of 2000 psig, for a total pressure drop of 2500 psig. The resulting sheared pectin gel particles were then put aside 20 while the rest of the product was prepared. The gel particles had a volume mean diameter of 38.2μ as measured by the Brinkmann Particle Size Analyzer. They were also seen to be very irregular in shape when viewed with a light microscope.

The "C" water was placed in a stainless steel beaker, into which was lowered a Talbot overhead mixer with a propeller blade. The mixer was set on high speed, and the remainder of the "C" ingredients were then added to the water and were allowed to mix for five minutes to ensure complete dispersion. The beaker and its contents were then heated to 85 degrees Celsius, the sheared pectin gel ("A" ingredients) was added in, and the mixer was allowed to continue for a period of five minutes with heating as the temperature was increased back to 85 degrees Celsius. The product was then poured into cans, which were then sealed and retorted sufficiently to sterilize the product. This product was a homogeneous, stable, creamy soup with a fatty and full bodied texture, similar to a regular full-fat soup.

Other features, advantages, and modifications to this invention will become readily apparent to those skilled in this art after reading the foregoing disclosure. In this regard, while specific embodiments of this invention have been described in considerable detail, variations and modifications of these embodiments can be effected without departing from the spirit and scope of the invention as disclosed and claimed.

What is claimed is:

1. A fat simulating composition comprising a substantial portion of heat stable, nonspheroidally shaped carbohydrate gel particles, he carbohydrate being selected from the group consisting of pectins, pectates, alginates, agar-agar, konjac, gellan gum, kappa carrageenan, curdlan and mixtures thereof, and said particles:
   having a longest axial dimension of up to about 250 microns with a mean volume diameter ranging from about 10 microns to about 100 microns; and
   having the substantially smooth organoleptic character of an oil emulsion.

2. The fat simulating composition of claim 1 wherein the particles are formed by passing large gel particles through a single pass shearing device.

3. The fat simulating composition of claim 1 wherein a substantial portion of said particles have a branched configuration.

4. The fat simulating composition of claim 1 wherein said particles are comprised of at least 0.1% by weight of a carbohydrate.

5. The composition of claim 1 wherein said particles are not shear reversible.

6. The composition of claim 1 wherein said gel particles further comprise other food additives and flavoring agents.

7. In a food product normally containing a fat or oil, the improvement comprising substituting for all or a portion of the fat and/or oil in the food product the fat simulating composition of claim 6.

8. The improved food product of claim 7 wherein the food is selected from the group consisting of spreads, mayonnaise, salad dressings, ice cream, icings, bakery fillings, processed cheeses, sour cream, peanut butter, soups, sauces, gravies, baked goods and meat products.

9. The composition of claim 1 wherein said gel particles comprise carbohydrate and water in proportions effective to form a gel.

10. The composition of claim 6 wherein said gel particles comprise carbohydrate and water in proportions effective to form a gel.

11. The composition of claim 1 wherein said gel particles comprise carbohydrate, a gel inducing cation, and water in proportions effective to form a gel.

12. The composition of claim 6 wherein said gel particles comprise carbohydrate, a gel inducing cation, and water in proportions effective to form a gel.

13. In a food product normally containing a fat or oil, the improvement comprising substituting for all or a portion of the fat and/or oil in the food product the fat simulating composition of claim 1.

14. The improved food product of claim 13 wherein the food is selected from the group consisting of spreads, mayonnaise, salad dressings, ice cream, icings, bakery fillings, processed cheeses, sour cream, peanut butter, soups, sauces, gravies, baked goods and meat products.

15. The fat simulating composition of claim 1 wherein the carbohydrate is selected from the group consisting of pectins, pectates, and alginates.

16. The fat simulating composition of claim 1 wherein a cation selected from the group consisting of calcium, magnesium, sodium, potassium, ammonium, and aluminum is present.

17. A process for making a fat simulating composition comprising:
   a) mixing a carbohydrate selected from the group consisting of pectins, pectates, alginates, agar-agar, konjac, gellan gum, kappa carrageenan, curdlan and mixtures thereof with water to form a gel,
   b) chopping the gel to form a processable mass comprised of coarse particles of less than about 10 mm in size,
   c) shearing the coarse particles to form nonspheroidally shaped carbohydrate gel particles having a longest axial dimension of up to 250 microns with a mean volume diameter ranging from about 10 microns to about 100 microns, the particles being effective to have the substantially smooth organoleptic character of an oil emulsion.

18. The process of claim 17 wherein the particles are sheared in a homogenizer at normal operating pressures.

19. The process of claim 17 wherein the particles are sheared at a pressure of from about 500 to about 5000 psig.

20. The process of claim 17 wherein said pressure is 1500 to about 3000 psig.

21. The process of claim 18 wherein said homogenizer is a two stage device operating a pressure in the first stage at 500 to 5000 psig and in the second stage at 0 to 700 psig.

22. The process of claim 21 wherein said homogenizer operates at a pressure in the first stage of 1000 to 3000 psig and in the second stage at 300 to 700 psig.

23. The process of claim 17 wherein said particles are not shear reversible.

24. The process of claim 17 wherein said particles are heat stable.

25. The process of claim 17 wherein said gel particles comprise carbohydrate and water in proportions effective to form a gel.

26. The composition of claim 17 wherein said gel particles comprise carbohydrate, a gel inducing cation, and water in proportions effective to form a gel.

27. The process of claim 17, wherein the carbohydrate is selected from the group consisting of pectins, pectates, and alginates.

28. The process of claim 17 wherein a cation selected from the group consisting of calcium, magnesium, sodium, potassium, ammonium, and aluminum is present in step (a).

* * * * *

UNITED STATES PATENT AND TRADEMARK OFFICE
CERTIFICATE OF CORRECTION

PATENT NO. : 5,324,531
DATED : June 28, 1994
INVENTOR(S) : A. C. Hoefler, J. A. Sleap, and J. E. Trudso It is certified that error appears in the above-indentified patent and that said Letters Patent is hereby corrected as shown below:

Column 8, claim 1, line 42

" ... gel particles, he carbohydrate being ... "

should read -- ... gel particles, the carbohydrate being ... --

Title page, item

[56] References Cited - Other Publications, 4th line

" ... Replacement ... Splended™, 1991, pp. 1-10 ..."

should read -- ... Replacement ... Slendid™, 1991, pp. 1-10 ... --

Signed and Sealed this

Ninth Day of May, 1995

Attest:

BRUCE LEHMAN

Attesting Officer

Commissioner of Patents and Trademarks